United States Patent [19]

Hosoi

[11] 4,132,493
[45] Jan. 2, 1979

[54] BALL END MILL

[76] Inventor: Ryosuke Hosoi, 5-9-10, Kami-minami, Hirano-ku, Osaka, Japan

[21] Appl. No.: 768,924

[22] Filed: Feb. 15, 1977

[30] Foreign Application Priority Data

Sep. 2, 1976 [JP] Japan ................................ 51-105639

[51] Int. Cl.² .......................... B23C 5/02; B23C 5/10
[52] U.S. Cl. ....................................... 407/53; 407/42; 407/54; 408/230
[58] Field of Search ......................... 29/103 A, 105 R; 408/230; 407/40, 41, 34, 42, 54, 53

[56] References Cited

U.S. PATENT DOCUMENTS

| 271,646 | 2/1883 | Martignoni | 29/103 A |
|---|---|---|---|
| 2,113,178 | 4/1938 | Gase | 29/103 A |
| 2,328,629 | 9/1943 | Eich et al. | 408/230 |
| 3,696,484 | 10/1972 | Spriggs | 29/105 R |

FOREIGN PATENT DOCUMENTS 2521938  5/1975  Fed. Rep. of Germany ........... 408/230

*Primary Examiner*—Leonidas Vlachos
*Attorney, Agent, or Firm*—Frank J. Jordan

[57] ABSTRACT

A single-toothed ball end mill provided with a cutting edge including a starting end, positioned near the center of rotation of the end mill and having an upright portion. The cutting edge is defined by a line curved outwardly in the direction of rotation of the end mill when viewed from the bottom. The cutting edge has its greatest curvature at the center portion of the end mill so as to permit the cutting edge to initiate a cutting operation with its starting end and to thereafter perform the cutting operation progressively in a radially outwardly direction.

9 Claims, 21 Drawing Figures

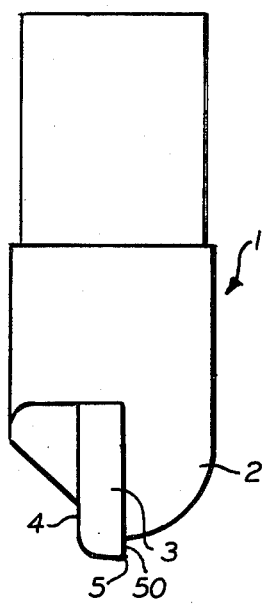
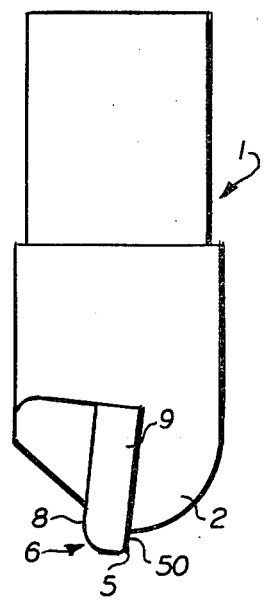
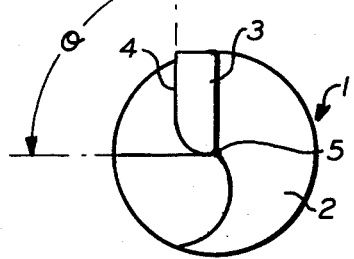
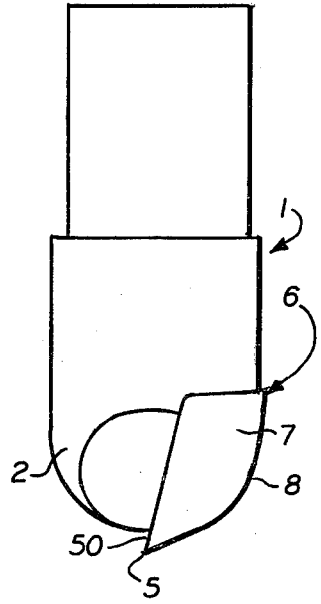
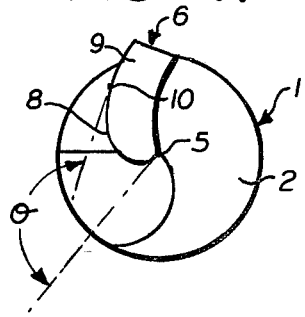

BALL END MILL

This invention relates to improvements in a ball end mill.

Conventional ball end mills comprise two teeth each having a straight or helical outer periphery and which intersect each other at the center of a ball-shaped end. When viewed from the bottom, the curved cutting edges at the ball-shaped end appear almost straight. Accordingly, when the end mill is driven for a cutting operation, the cutting edges, from the center to an outer peripheral portion thereof, come into contact with the work almost at the same time. This results in the cutting edges being subjected to a great impact force during the cutting operation and thus being liable to damage, thereby failing to perform a heavy-duty cutting operation. Further, with the recent tendency to fabricate dies of materials of increased hardness which are cuttable only with greater difficulty, there arises the necessity of using cemented carbides for end mills. However, cemented carbide cutting edges are subject to damage when used at a speed lower than is specified. With ball end mills in which cemented carbides are used, the cutting edge becomes damaged in the vicinity of the center, because even when the mill is driven at a high speed, the center portion cuts at a reduced speed. Additionally, cutting edges of the conventional configuration cut the work while the chip resulting from the preceding cutting operation still remains adhered to the rake face. Consequently, the cutting edge bites into the old chip, whereupon stress occurs in the cutting edge, rendering the edge prone to damage. For these reasons, it has been considered impossible to use cemented carbides for ball end mills. In fact, cemented carbides have found limited use only for manual milling machines adapted to cut the work only by very small increments and at a high speed.

Accordingly, an object of this invention is to provide a ball end mill having a cutting edge adapted to initiate a cutting operation with its starting end at the center of the mill and to thereafter perform the cutting operation progressively so as to operate free of any impact load.

Another object of this invention is to provide a ball end mill adapted for a heavy cutting operation.

Another object of this invention is to make it possible to use cemented carbides for the cutting edge.

Another object of this invention is to provide an end mill capable of cutting workpieces with ease which workpieces are usually difficult to cut.

Another object of this invention is to provide an end mill having a cutting edge which is highly durable and operable free of any damage.

Another object of this invention is to provide an end mill ensuring that chips are removable outwardly without adhering to its cutting edge.

Still another object of this invention is to provide an end mill which generates a reduced temperature gradient between the center portion of the mill and an outer periphery thereof so as to reduce thermal stresses during the cutting operation.

Other features and advantages of this invention will become apparent from the following description and the accompanying drawings, in which:

FIG. 1 is a side elevation showing a ball end mill according to one embodiment of this invention;

FIG. 2 is a bottom view of the ball end mill shown in FIG. 1;

FIG. 3 is a side elevation showing another embodiment of a ball end mill;

FIG. 4 is a bottom view of the ball end mill of FIG. 3;

FIG. 5 is a side elevation of the ball end mill as it is seen from the left side of FIG. 3;

Figure 7:
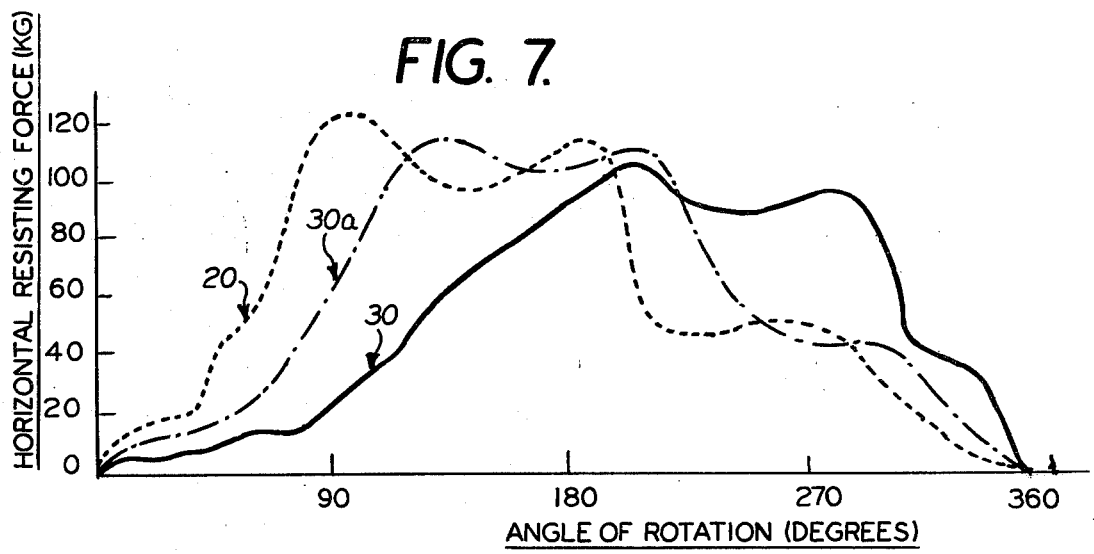
Figure 8:
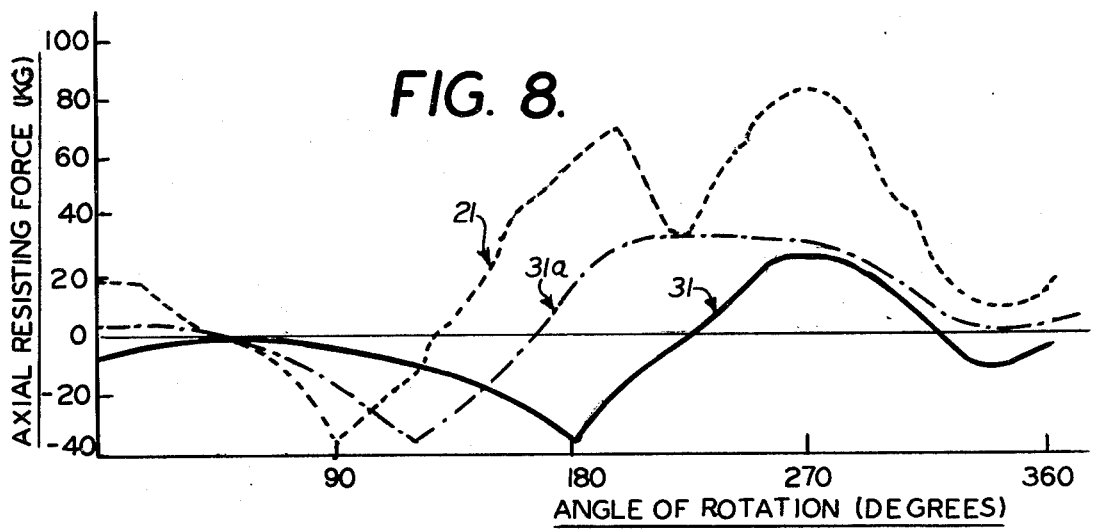
Figure 9:
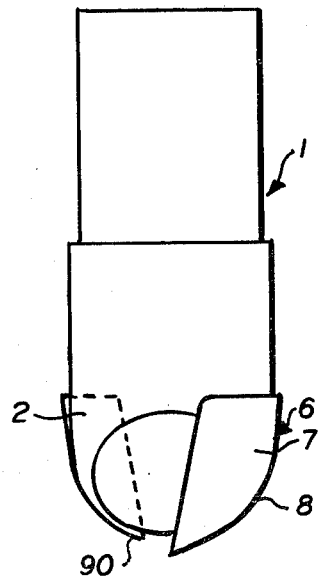
Figure 10:
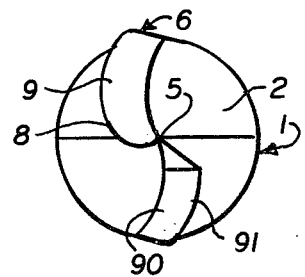
Figure 11:
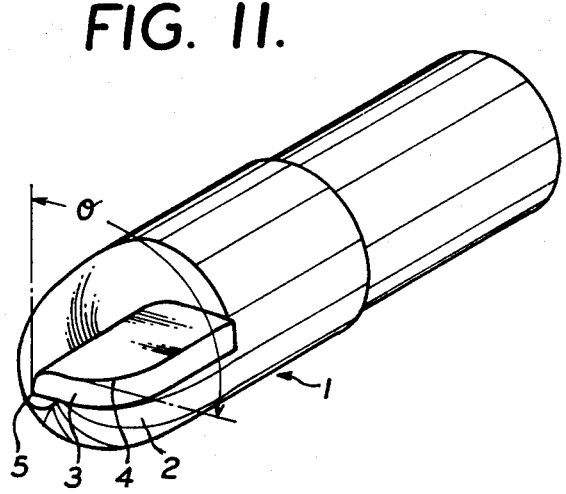
Figure 12:
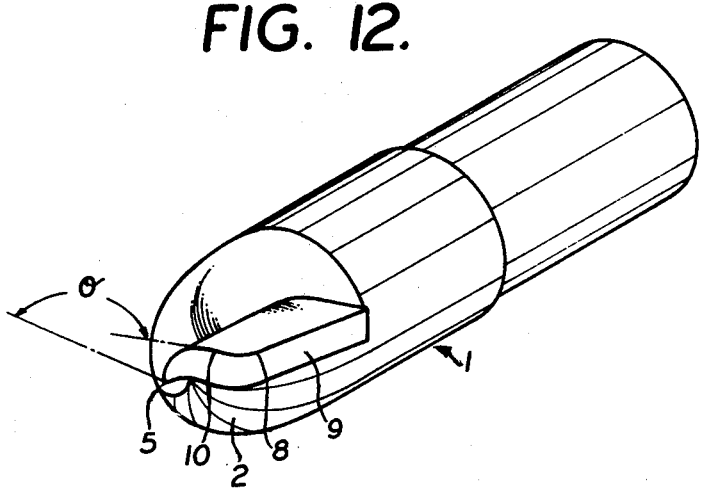
Figure 13:
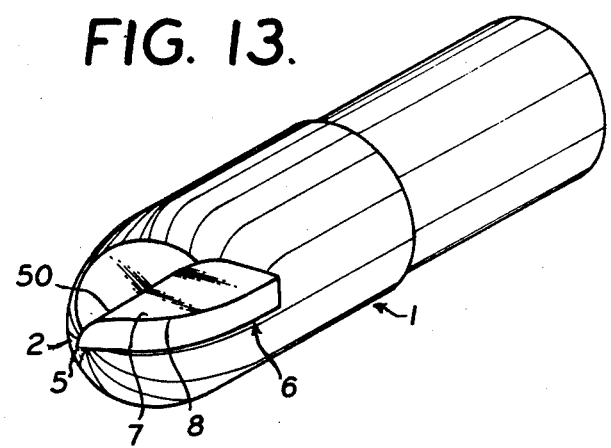

FIGS. 6(a) to 6(h) are views illustrating the cutting operation of the ball end mill of FIGS. 3–5 in comparison with that of a conventional ball end mill;

FIG. 7 is a diagram showing the distribution of horizontal resisting forces acting during the cutting operation with the use of mills of this invention and with a conventional mill;

FIG. 8 is a diagram similar to that of FIG. 7 showing the component of force acting axially of mills of this invention and of the prior art;

FIG. 9 is a side elevation showing a ball end mill according to another embodiment of this invention;

FIG. 10 is a bottom view of the ball end mill shown in FIG. 9;

FIG. 11 is a perspective view of the ball end mill shown in FIG. 1;

FIG. 12 is a perspective view of the ball end mill shown in FIG. 3;

FIG. 13 is a perspective view of the ball end mill shown in FIG. 5; and

Figure 14:
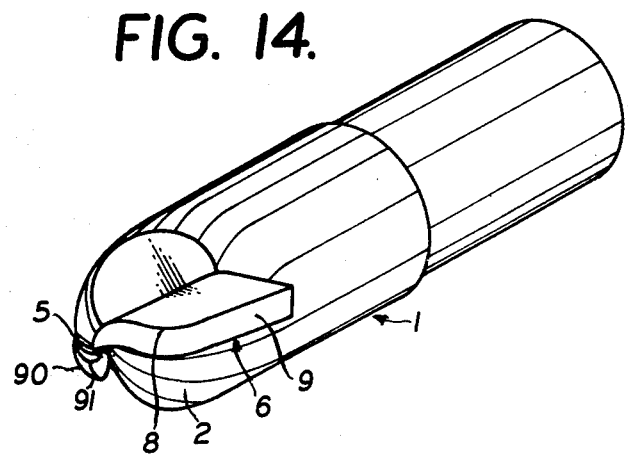

FIG. 14 is a perspective view of the ball end mill shown in FIG. 9.

FIGS. 1 and 2 show an end mill main body or shank 1 having a ball-shaped end 2, and a tip 3 formed with a cutting edge 4 having a starting end 5. The tip 3 is in the form of a flat plate and is secured to the ball-shaped end 2 with the starting end 5 positioned on the axis of the end mill 1. When the mill is viewed from the bottom, the cutting edge 4 is curved outwardly in the direction of rotation of the mill and is so shaped that it has its greatest curvature in the vicinity of the center of the mill and is defined by a straight line at its outer peripheral portion. The angle $\theta$ between the tangential line of the cutting edge at the center point and the tangential line of the edge at its outer peripheral portion is 90°. The tip 3 projects outwardly beyond the end of the mill 1 to provide an upright portion or projection 50 at the starting end of the edge 4.

FIGS. 3 to 5 show another embodiment of this invention in which the tip 6 is inclined with respect to the axis of the end mill 1 and has a cutting edge 8. The tip 6 has a rake face 7 and a flank 9. The cutting edge 8 is so shaped that it has a great curvature when seen in side elevation (FIG. 5) and a progressively increasing curvature toward the center when seen from the bottom (FIG. 4), the edge 8 thus being defined by a spiral curved line. Since the tip 6 is inclined, the cutting edge has a gently spiralling curved line also at its outer peripheral portion. The tip 6 can be made of a cemented carbide or high-speed steel. The tip 6 formed with the cutting edge may be of the throwaway type or, alternatively, the cutting edge may be formed integrally with the main body 1.

Figure 6A:
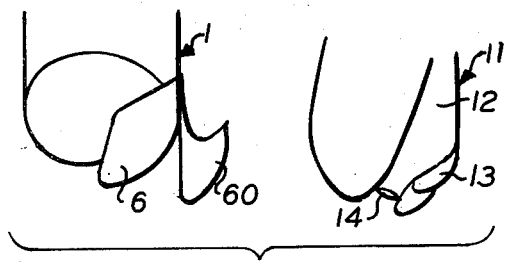
Figure 6B:
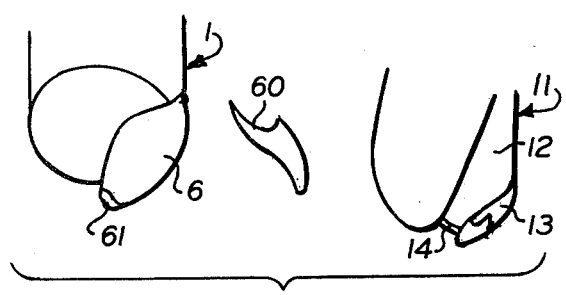
Figure 6C:
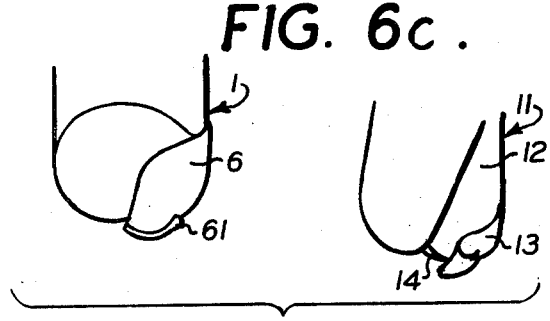

The end mill shown in FIGS. 3 to 5 is used for a cutting operation, with the results shown on the left side of FIGS. 6(a) to 6(h) based on a series of photographs. For comparison, the cutting operation conducted with use of a conventional end mill is illustrated on the right side of the same figures. The tips of both the end mills are made from cemented carbides of superfine particles having hardness ($H_{RA}$) of 90.6. The end mills are driven at 1,500 r.p.m. for down cutting while a workpiece (made of a steel suitable for usual machine structures and having a tensile strength of at least 45 kg/mm$^2$) is fed at a rate of 0.3 mm per revolution of the end mill. The end mills are illustrated as being angularly displaced by 45° increments. FIG. 6(a) shows the end mill when it has completed one complete turn of a cutting operation. With the end mill of this invention, it is seen that a chip 60 is rolled outward away from the rake angle of the tip 6 to a position where the chip will not affect the following turn of cutting operation, the chip being shown immediately before it is released from the tip, which is free of load. With the conventional mill, a chip 13 adheres to the rake face of the tip 12 although one turn of cutting operation has been completed. FIG. 6(b) shows the end mills having rotated 45°. With the mill of this invention, the chip 60 is clear of the mill, and the starting end of the tip starts to cut into the workpiece, forming a chip 61, whereas the conventional mill has not started to cut the workpiece, since the previous chip 13 still adheres to the mill. Indicated at 14 is a portion of the workpiece which has remained uncut during the previous turn of the mill. The portion 14 is shown as being scraped off by the cutting edge. Such remaining portion occurs for the following reason. In the case of the conventional mill, the cutting edge curve, when seen from the bottom, extends radially from the center as a substantially straight line, so that over the entire length of the cutting edge corresponding to the depth of cut, the edge comes into contact with the workpiece at the same time. Since the cutting edge of the ball end mill is supported more elastically than other cutters, a marked elastic deformation takes place, leading to elastic slippage and a failure to engage and cut the workpiece accurately. In contrast, because the curve of the cutting edge according to this invention is spiral when seen from the bottom, the cutting point shifts from the center progressively outwardly as the end mill rotates. Whereas the entire cutting edge of the conventional end mill, including its center, instantaneously passes a vertical section of the end mill during rotation, the point where the cutting edge of the invention passes such vertical section shifts outwardly from the starting end of the spiral cutting edge. Thus the cutting edge completely passes the vertical section upon turning through an arc of 90°. In other words, the difference in cutting width between the two end mills corresponds to the difference between a point and a line. The end mill of this invention cuts the workpiece smoothly free of slippage while exerting such a force as to push the chip in a circumferential direction from the center portion. Consequently, the chip will not be forced against and adhere to the rake face. The end mills in the position of FIG. 6(b) turn through an additional 45° to the position of FIG. 6(c). In this state, the end mill of this invention has almost completed cutting in the vicinity of the center of the cutting edge, and the cut line of the chip starts to shift outward from the center portion. Thus, the chip 61 formed near the center starts to elongate into a strip toward the outer periphery, while in the vicinity of the center the chip starts to leave the rake face of the cutting edge. This indicates that the cutting edge is cutting the workpiece in such manner as to remove the chip from the center portion, forcing out the chip outwardly, and that the cutting line is progressively shifting outwardly. The cutting mechanism of the mill of this invention in which the cutting edge cuts the workpiece while causing the starting end to force the chip away from the center portion outward is advantageous also from the viewpoint of thermal stress. It is noted that the speed of movement of the cutting edge decreases toward its center, with the result that high-speed continuous cutting operation produces a temperature difference between the center portion and an outer peripheral portion, consequently giving rise to thermal stress. According to this invention, however, the curve of the cutting edge has a greater curvature at its center portion than at a peripheral portion thereof, permitting the edge to force the chip away from the center portion outwardly. The resulting heat of friction serves to reduce the temperature difference between the center portion and the outer peripheral portion. At the same time, the adhesion of the chip can be prevented. On the other hand, the conventional mill in the position of FIG. 6(c) remains out of cutting operation but is scraping the portion remaining uncut during the previous revolution of the mill, with the chip 13 still adhering to its rake face.

Figure 6D:
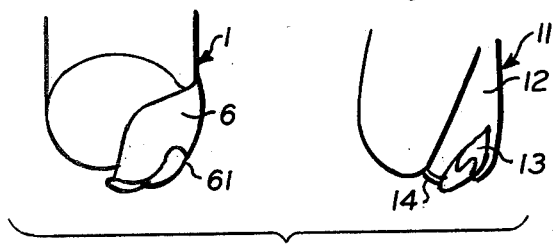

The end mills further turn through 45° to the position of FIG. 6(d). With the mill of this invention, the cutting edge has completely cut in to the depth of cut, with the chip near the center portion removed from the rake face and torn off from the workpiece. The cut line of the chip 61 shifts outward. Thus the cutting edge near the starting end has completed cutting, and the outer portion of the edge is now cutting. On the other hand, the conventional mill in this position starts to cut the workpiece, with its starting end and almost simultaneously with its outer portion. The chip 14 therefore grows, forcing up the previous chip 13. Because the cutting edge, from its starting end to an outer peripheral portion thereof, starts to cut almost simultaneously, the conventional mill is subjected to an increased impact force upon initiation of the cutting operation, as will be evidenced by the comparison tests conducted for cutting resistance.

Figure 6E:
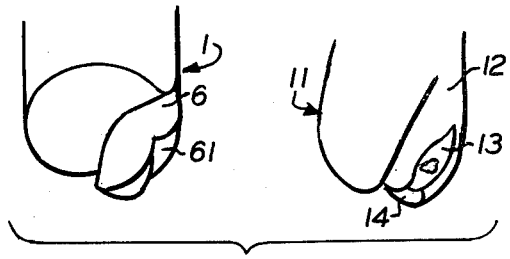
Figure 6F:
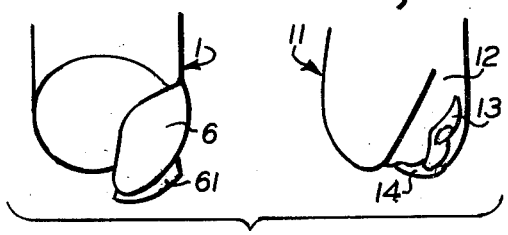

The mills further rotate from the position of FIG. 6(d) to the position of FIG. 6(e). With the mill of this invention, the chip 61 grows with its cut line moving outwardly and moves further away from the starting end of the cutting edge by bending itself, whereas the chip 14 formed by the conventional mill is forced against the rake face of the edge 12 while growing and while pushing up the previous chip 13.

Figure 6G:
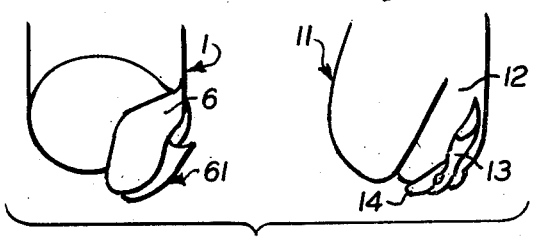
Figure 6H:
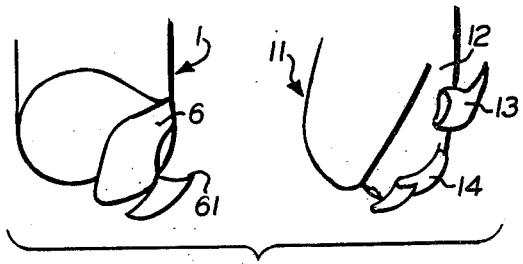

While rotating from the position of FIG. 6(g) to that of FIG. 6(h), the mill of this invention completes cutting, causing the chip 61 to completely roll up outwardly and to be released from the edge. During the corresponding rotation of the conventional mill, the chip 14 pushes out the previous chip 13, and the cutting edge will perform the subsequent cutting operation with the chip 14 adhering to its rake face as in the position of FIG. 6(a) discussed earlier.

As will be apparent from the above description, this invention ensures an easy cutting operation at the center end portion of the ball end mill where problems have heretofore been encountered. Whereas the conventional cutting edges are substantially straight in the vicinity of the center, the cutting edge of this invention is curved to facilitate initiation of the cutting operation, which is thereafter conducted progressively, whereby an abrupt increase in cutting resistance is eliminated. To ensure satisfactory results, the curve of the cutting edge should not have too small a value for the angle $\theta$; the angle $\theta$ is preferably at least 35°, as will be apparent from FIGS. 7 and 8 showing the values of the stress acting between the work and the tip. FIG. 7 shows the combined force of a component acting in the feed direction of the workpiece and a component acting in the direction of a plane of the workpiece perpendicular to the feed direction. The curve 20 represents a conventional mill, and the curve 30 represents a mill of this invention in which the angle $\theta$ is about 150° and the curve 30a another mill of this invention wherein the angle $\theta$ is 35°. With the rotation of the end mill, the curve 20 steeply rises to a peak, whereas the curve 30 gently extends upward. This indicates that the conventional tip is subjected to an abruptly increasing load upon initiation of cutting, whereas the tip of this invention is subjected to a gradually increasing load without being acted on by an impact load on the initiation of the operation. The maximum load is lower because of the gradual progress of the cutting operation. FIG. 7 also indicates that even the mill of this invention represented by the curve 30a and having an angle $\theta$ of 35° encounters a more gentle increase in the load than the conventional mill, evidencing the gradual progress of cutting operations. FIG. 8 shows the component of force acting axially of the end mill. The forces with which the tip depresses the workpiece downward are given in positive values, while the forces pulling the workpiece upward are given in negative values. The line 21 represents a conventional mill, whereas the curve 31 represents a mill according to this invention. The drawing reveals noticeable slippage of the conventional mill taking place on the initiation of cutting operation, whereas the mill of this invention is shown to be free of any slippage on the initiation of the operation. These results indicate that with the conventional mill the slippage is followed by a cutting action with an abrupt load coincident with the initiation thereof and that with the mill of the invention, the cutting operation is immediately initiated and proceeds gradually to a maximum without involving any impact load acting on the cutting edge. Even the mill of this invention represented by the curve 31a and having an angle $\theta$ of 35° involves greatly reduced slippage, assuring smooth initiation of operation. The effect contemplated by this invention is therefore achievable with an angle $\theta$ of at least 35°.

In the comparison tests conducted on the mills of this invention and of the prior art, workpieces of easily cuttable material were used, because difficulty cuttable workpieces will damage the conventional mills, rendering them inoperable. To facilitate the comparison between the invention and the prior art, single-toothed mills are used as the conventional mills.

This invention can be embodied with the construction shown in FIGS. 9 and 10. The tip 6 is the same as the one already described. This embodiment further includes another tip 90 having an auxiliary cutting edge 91 which is so positioned as to have the same path as the cutting edge 8. The auxiliary cutting edge 91 may be formed on a portion of the end mill other than the vicinity of the center of rotation of the mill. With this construction, the tip 6 starts to cut the workpiece with its center portion and thereafter performs the cutting action progressively, fully ensuring the effect contemplated by this invention. The outer peripheral portion of the end mill cuts the work with the auxiliary cutting edge 91, thereby reducing the load to be otherwise assumed by the tip 6.

As already stated, the cutting edge of this invention, when viewed from the bottom, is defined by a curved line having a greater curvature at the center portion of the end mill than at an outer peripheral portion thereof.

This ensures the following outstanding advantages. With the center portion having an increased curvature, the cutting position shifts from the center outward, permitting the cutting edge to force the resulting chip away from the center outward, whereby the slippage experienced with conventional mills is precluded. The cutting operation, which proceeds progressively outwardly from the center, can be performed free of any impact load. The force acting to force the chip outward from the center portion moves the chip outward as the cutting point correspondingly shifts outward, without permitting the chip to be pressed against the rake face and thus ensuring smooth separation and removal of the chip. Moreover, the force exerted by the cutting edge to push the chip outward from the center produces heat of friction on the edge, serving to reduce the temperature gradient between the center portion and the outer peripheral portion. This diminishes the thermal stress in the tip and prevents adhesion of the chip. With these advantages, it has become possible to use cemented carbides for ball end mills which has heretofore been considered impractical and to machine materials which are hard to cut. More specifically, the invention assures outstanding cutting performance for the heavy-duty cutting of steels for dies having high hardness and high toughness, of copper and usual low-carbon steels having high ductility, of stainless steel having high hardness when processed, of cast iron composed of hard fine particles or of stainless steel or titanium materials having affinity with cemented carbides.

These outstanding advantages are afforded by the particular configuration of the cutting edge which, when seen from the bottom, has a greater curvature at the center portion than at an outer peripheral portion thereof. In fact, this invention is basically characterized by the greatly increased curvature of the cutting edge at its center portion as compared with conventional mills and by the upright rake face at the center portion. The most suitable curvature depends on the material of the workpiece, cutting conditions, etc. The experiments conducted by the inventor reveal that the advantages of this invention can be assured when the angle $\theta$ between the tangential line of the cutting edge curved line at its starting end and the tangential line at a point 10 (see FIG. 4) which is 0.7R (wherein R is the radius of the end mill) away from the center is at least 35° as the edge is viewed from the bottom. Under usual conditions, the greater this angle, the greater will be the effect thereby achieved.

What is claimed is:

1. A toothed ball end mill comprising a shank having a ball end, a tooth projecting axially of said shank having a cutting edge formed thereon, said cutting edge including a starting end located adjacent the longitudinal axis of said shank and extending along a line which curves radially outwardly in the direction of rotation of the end mill and having its greatest curvature proximate the central portion of the end mill, said curved line of the cutting edge progressively increasing in curvature from an outer peripheral portion of the end mill toward the center portion thereof.

2. A ball end mill as defined in claim 1, wherein when the tooth is seen from a bottom end view the angle subtended between a tangential line of the cutting edge at its starting end and a tangential line thereof at a point 0.7R away from the center of the end mill is at least 35°, R representing the radius of the end mill.

3. A ball end mill as defined in claim 1, wherein the cutting edge at the starting end thereof projects beyond the end of the end mill.

4. A ball end mill as defined in claim 1, wherein the cutting edge formed on a tip element releasably mountable on said shank.

5. A ball end mill as defined in claim 4 wherein the tip element is made of cemented carbides.

6. A ball end mill as defined in claim 5 wherein an auxiliary cutting edge following the same path as the cutting edge on said tooth is formed on a portion of the end mill other than in the vicinity of the center of rotation of the end mill.

7. A ball end mill as defined in claim 5, wherein when the tip element is seen from a bottom end view the angle subtended between a tangential line of the cutting edge at its starting end and a tangential line thereof at a point 0.7R away from the center of the end mill is at least 35°, R representing the radius of the end mill.

8. A ball end mill as defined in claim 7, wherein said angle is at least 90°.

9. A ball end mill as defined in claim 8, wherein an auxiliary cutting edge following the same path as the cutting edge on said tooth is formed on a portion of the end mill other than in the vicinity of the center of rotation of the end mill.

* * * * *